United States Patent
Woo (10) Patent No.: US 8,412,168 B2
(45) Date of Patent: Apr. 2, 2013

(54) BROADCAST RECEIVER AND METHOD OF RECEIVING BROADCAST THEREOF

(75) Inventor: Sung Ho Woo, Goyang-si (KR)

(73) Assignee: LG Electronics Inc., Seoul (KR)

( * ) Notice: Subject to any disclaimer, the term of this patent is extended or adjusted under 35 U.S.C. 154(b) by 690 days.

(21) Appl. No.: 11/854,951

(22) Filed: Sep. 13, 2007

(65) Prior Publication Data

US 2008/0242358 A1    Oct. 2, 2008

(30) Foreign Application Priority Data

Mar. 26, 2007  (KR) .................. 10-2007-0029317

(51) Int. Cl.
*H04L 29/06* (2006.01)
*H04H 20/74* (2008.01)
*H04H 20/71* (2008.01)
*H04W 24/00* (2009.01)
*G01C 21/34* (2006.01)
*G08G 1/123* (2006.01)

(52) U.S. Cl. .................. 455/414.3; 455/457; 455/3.02; 455/3.01; 701/527; 701/533; 701/538

(58) Field of Classification Search .............. 455/414.3, 455/3.02, 3.01, 457; 701/211, 200, 201, 701/527, 533, 538

See application file for complete search history.

(56) References Cited

U.S. PATENT DOCUMENTS

| 2004/0068362 | A1* | 4/2004 | Maekawa et al. | 701/200 |
| 2006/0015912 | A1  | 1/2006 | Itabashi | |
| 2006/0025070 | A1* | 2/2006 | Kim et al. | 455/3.02 |
| 2006/0064243 | A1* | 3/2006 | Hirose | 701/211 |

FOREIGN PATENT DOCUMENTS

| CN | 1734898 A | 2/2006 |
| CN | 1862230 A | 11/2006 |
| EP | 1605673 A1 * | 12/2005 |
| EP | 1 612 516 A1 | 1/2006 |
| EP | 1 819 168 A2 | 8/2007 |
| JP | 2002-247530 A | 8/2002 |
| KR | 10-0605906 A | 8/2006 |

* cited by examiner

*Primary Examiner* — Jinsong Hu
*Assistant Examiner* — Opiribo Georgewill
(74) *Attorney, Agent, or Firm* — Birch, Stewart, Kolasch & Birch, LLP (57) ABSTRACT

A method of receiving a broadcast on a broadcast terminal. The method includes displaying the received broadcast on a display of the broadcast terminal, and providing location information about a specific place or location shown on the currently displayed broadcast to a user of the broadcast terminal.

20 Claims, 14 Drawing Sheets

BROADCAST RECEIVER AND METHOD OF RECEIVING BROADCAST THEREOF

This application claims the benefit of Korean Patent Application No. 10-2007-0029317, filed on Mar. 26, 2007, which is hereby incorporated by reference in its entirety.

BACKGROUND OF THE INVENTION

1. Field of the Invention

The present invention relates to a broadcast terminal and corresponding method that provides location information about a specific place or location shown on the currently displayed broadcast to a user of the terminal.

2. Discussion of the Related Art

Mobile terminals are now being considered a necessity. For example, mobile terminals are now being used to perform many additional functions besides a basic call function. For example, users can now listen to music, access the Internet, view movies and broadcast programs, play games, etc.

Broadcast terminals are now becoming very popular. In more detail, mobile terminals adapted to be broadcast terminals now receive several type of broadcast programs (e.g., sports, movies, television shows, news programs, tourist attractions, information about famous restaurants, etc.) from a variety of different broadcast providers. Thus, there is a need for providing more information to the user about a particular broadcast program.

SUMMARY OF THE INVENTION

Accordingly, one object of the present invention is to address the above-noted and other problems.

Another object of the present invention is to provide a broadcast receiver and corresponding method that provides information about a specific area or place shown on the broadcast.

To achieve these objects and other advantages and in accordance with the purpose of the invention, as embodied and broadly described herein, the present invention provides in one aspect a method of receiving a broadcast on a broadcast terminal. The method includes displaying the received broadcast on a display of the broadcast terminal, and providing location information about a specific place or location shown on the currently displayed broadcast to a user of the terminal.

In another aspect, the present invention provides a broadcast terminal, which includes a broadcast unit configured to receive a broadcast from a broadcasting network and to receive location information about a specific place or location shown in the received broadcast, a display unit configured to display information to the user, and a control unit configured to control the display to display the received broadcast and to provide the location information to a user of the broadcast terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5 to 6C are overviews illustrating a display unit screen of a mobile terminal implementing a method of receiving a broadcast according to a first embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, the present invention is applicable to any type of a terminal capable of receiving broadcasts such as a PDA (personal digital assistant), a game player, etc. as well as a broadcast receiving terminal. The following description refers to a mobile terminal that is capable of receiving a broadcast.

Figure 1:
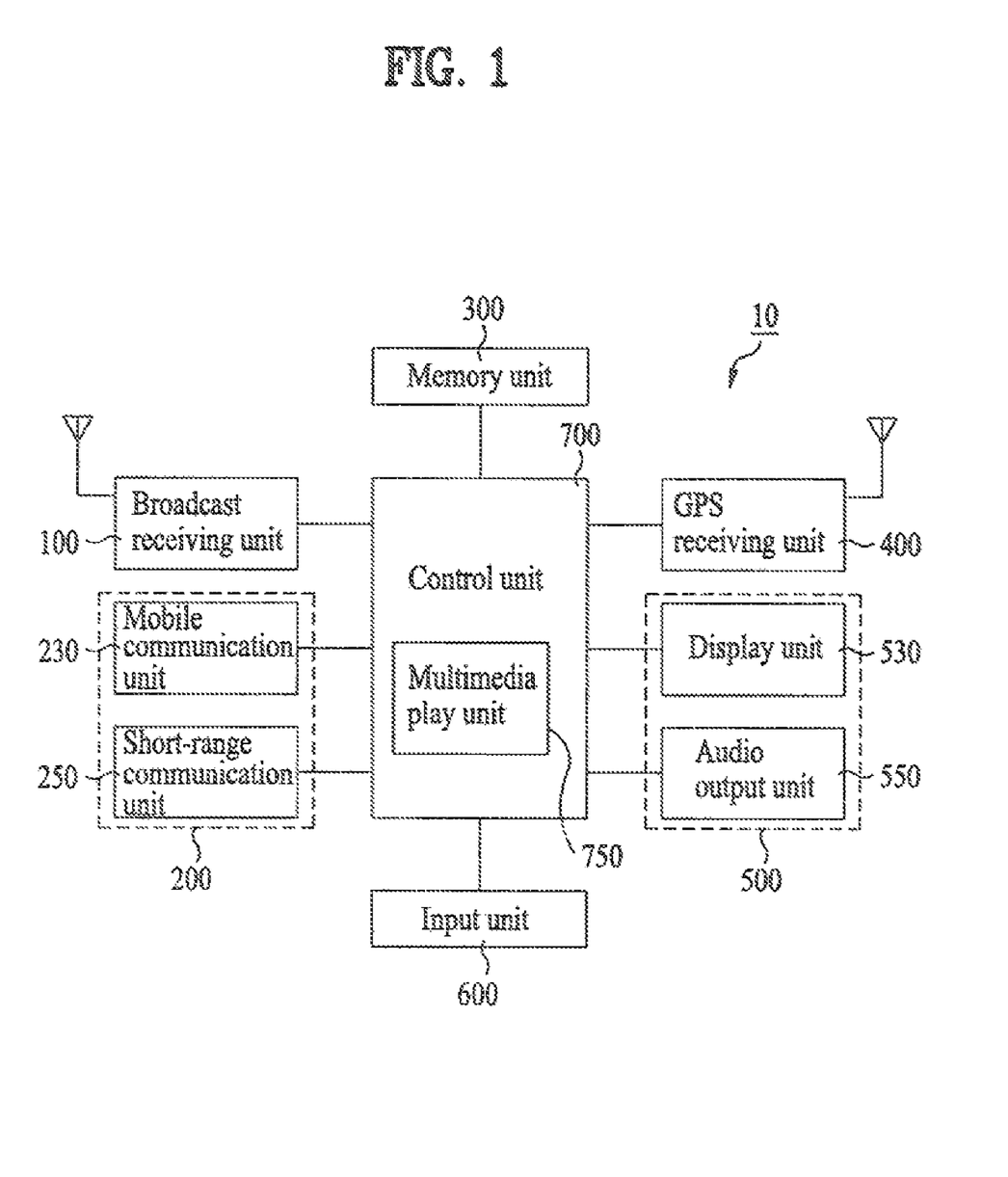
FIG. 1 is a block diagram of a mobile terminal according to an embodiment of the present invention.

Turning first to FIG. 1, which is a block diagram of mobile terminal 10 configured to receive broadcasts according to an embodiment of the present invention. As shown, the mobile terminal 10 includes a broadcast receiving unit 100, a communication unit 200, a memory unit 300, a GPS (global positioning system) receiving unit 400, a broadcast output unit 500, an input unit 600, and a control unit 700.

The mobile terminal 10 also includes other various elements such as a battery unit, etc., but because these additional elements are not directly associated with the present invention, a detailed explanation is omitted. Further, the elements in FIG. 1 are shown as single elements. However, the elements may be combined into a single element, if necessary.

In addition, the broadcast receiving unit 100 receives broadcasts transmitted on various broadcast channels. In more detail, broadcasting is a concept that includes mobile broadcasting such as the Eureka-147 standard based on European DAB (digital audio broadcasting), the DVB-H (digital video broadcasting-handheld) standard, the Media FLO (forward link only) standard led by Qualcomm Corporation, the Korean DMB (digital multimedia broadcasting) standard, the Japanese ISDB-T (integrated service digital broadcasting-terrestrial) standard as well as terrestrial DTV broadcasting, satellite DTV broadcasting standards, etc. Generally, digital broadcasting can be classified into video broadcasting, audio broadcasting, and data broadcasting.

Further, the communication unit 200 includes a mobile communication unit 230 and a short-range communication unit 250. In more detail, the mobile communication unit 230 enables the mobile terminal 10 to communicate with other terminals via a mobile communication network. The mobile communication unit 230 is configured to perform MMS (multimedia messaging system) communications and e-mail communications as well as SMS (short message service) communications via the mobile communication network. The mobile communication unit 230 is also configured to be able to access the Internet via the mobile communication network.

The short-range communication unit 250 enables the mobile terminal to communicate with other terminals via short-range communications. For example, the short-range communications includes infrared communications (IrDA), Bluetooth, Zigbee, etc. In addition, the communicating unit 200 itself or one of the mobile communication unit 230 and the short-range communication unit 250 can be removed from the mobile terminal if it is not required.

Further, the memory unit 300 stores various types of software programs and data used for performing various functions provided by the mobile terminal 10. For example, the memory unit 300 stores map data based on latitude/longitude coordinates, mail addresses, and other information requested or input by the user. Further, software relating to a navigation function can also be stored in the memory unit 300. The broadcasts received via the broadcast receiving unit 100 can also be stored in the memory unit 300.

In addition, the GPS receiving unit 400 receives GPS information from a satellites revolving around the earth. Thus, the GPS receiving unit 400 enables the navigation function to be implemented in the mobile terminal 10 together with the navigation software stored in the memory unit 300. However, if the navigation function is not used in the mobile terminal 10, the GPS receiving unit 400 can be appropriately omitted.

Further, the broadcast output unit 500 outputs the broadcast received via the broadcast receiving unit 100. As shown in FIG. 1, the broadcast output unit 500 includes a display unit 530 and an audio output unit 550. In particular, the display unit 530 displays images relating to the real-time operational status of the mobile terminal 10 and images according to various functions provided by the mobile terminal 10. The display unit 530 also displays images of a broadcast received via the broadcast receiving unit 100 and at least one navigation image when the mobile terminal 10 is provided with a navigation function.

Also, when the display unit 530 includes a touchscreen, the display unit 300 also functions as an input unit that receives various touch-commands or information from a user. In addition, the audio output unit 550 outputs various sounds according to the real-time operational status of the mobile terminal 10 and other functions provided by the mobile terminal 10. Specifically, the audio output unit 550 outputs the audio of a broadcast received via the broadcast receiving unit 100.

The input unit 600 enables a user to input various commands or information into the mobile terminal 10. In more detail, the input unit 600 includes any configuration capable of inputting various commands, information, etc. into the mobile terminal 10. For example, the input unit 600 includes a keypad, rotary dial, hot key, etc. In addition, if the display unit 530 includes the touchscreen operating as a separate input unit, the input unit 600 can be omitted from the mobile terminal 10.

Further, the control unit 500 controls the broadcast receiving unit 100, the communication unit 200, the memory unit 300, the GPS receiving unit 400, the broadcast output unit 500, and the input unit 600 to enable a broadcast channel selecting method explained in the following description to be executed in the mobile terminal 10. As shown in FIG. 1, the control unit 500 includes a multimedia play unit 750 that plays back multimedia contents (e.g., images, moving pictures, etc.) stored in the memory unit 300.

First Embodiment

Figure 2:
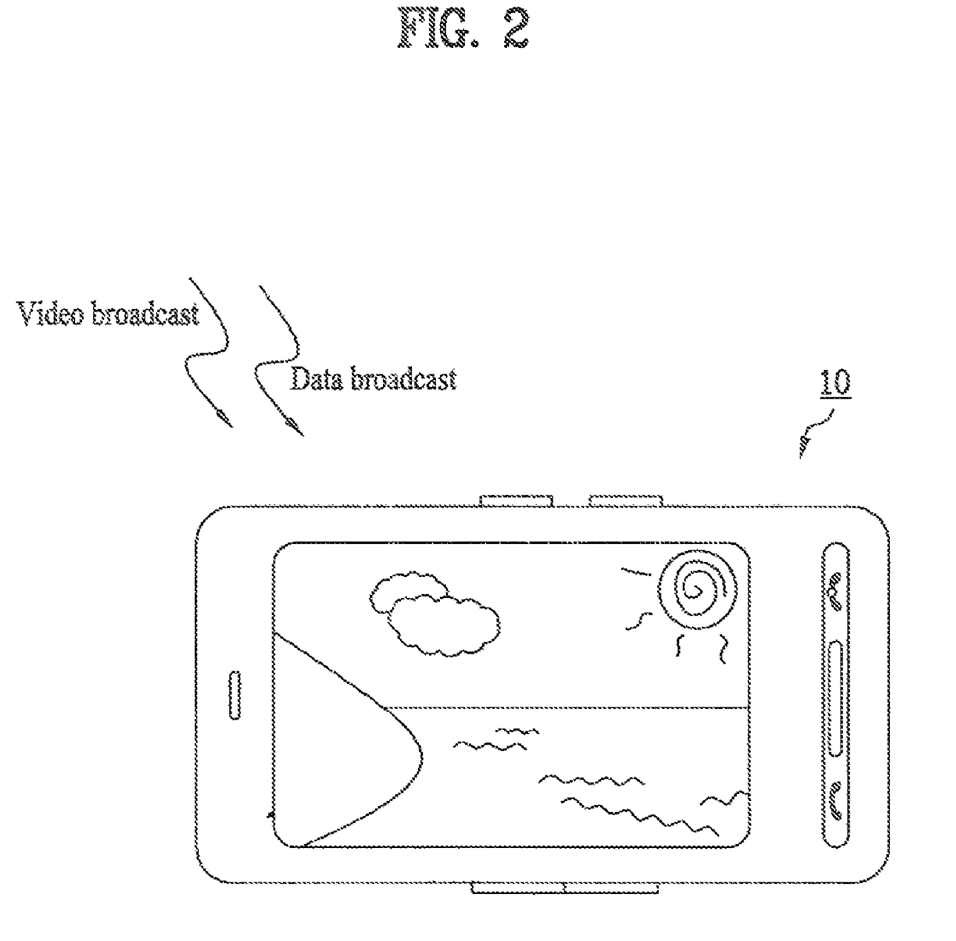
FIG. 2 is an overview illustrating a broadcast terminal receiving a broadcast according to a first embodiment of the present invention.

Turning first to FIG. 2, which is an overview of a mobile terminal receiving a broadcast according to a first embodiment of the present invention. In FIG. 2, a video broadcast and a data broadcast are provided to the mobile terminal 10. Further, the broadcast program is included in the video broadcast and information (hereinafter named 'location information') for a specific area or place associated with the broadcast program is provided to the mobile terminal 10 via the data broadcast. Thus, as shown in FIG. 2, the user is able to watch a broadcast on his or her mobile terminal.

Figure 3:
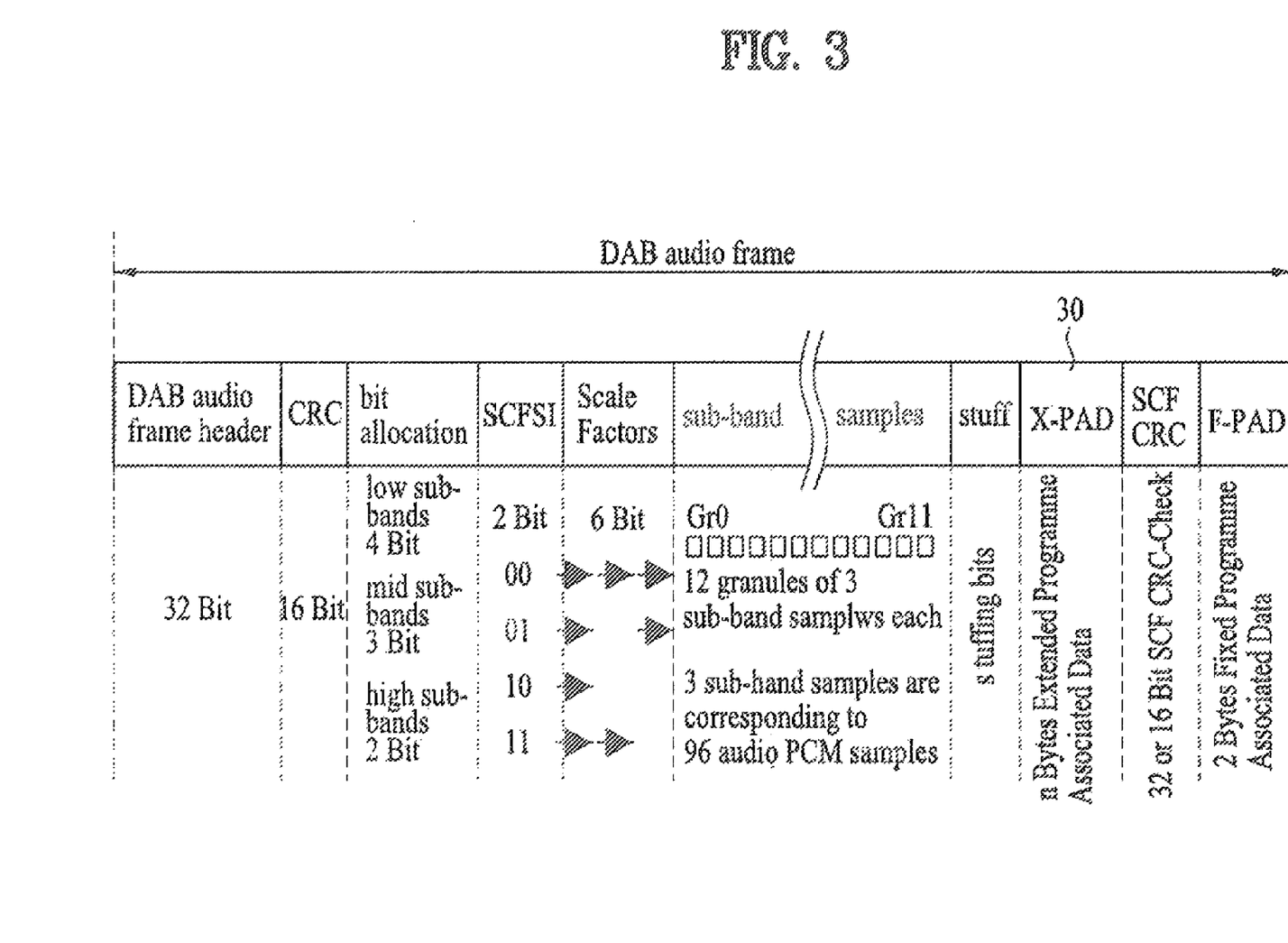
FIG. 3 is a structural diagram illustrating a DAB (Digital Audio Broadcasting) audio frame according to the Eureka-147 standard.

In addition, the location information can be transmitted in a portion of the audio frame included in the data broadcast. For example, FIG. 3 illustrates the location information being provided in the DAB (Digital Audio Broadcasting) audio frame according to the Eureka-147 standard. As shown in FIG. 3, the location information is provided in an X-PAD (extended program associated data) 30 section of the DAB frame. That is, the X-PAD 30 is a data field for providing a listener with additional information together with audio information such as a text, associated information, etc. Further, the length of the X-PAD 30 is predetermined by a service provider.

In addition, the types of the location information transmitted via the data broadcast is diversified and includes, for example, latitude/longitude coordinates for a specific place, a mailing address for a specific place, a map image for a specific place, and an Internet address for a specific place.

Figure 4:
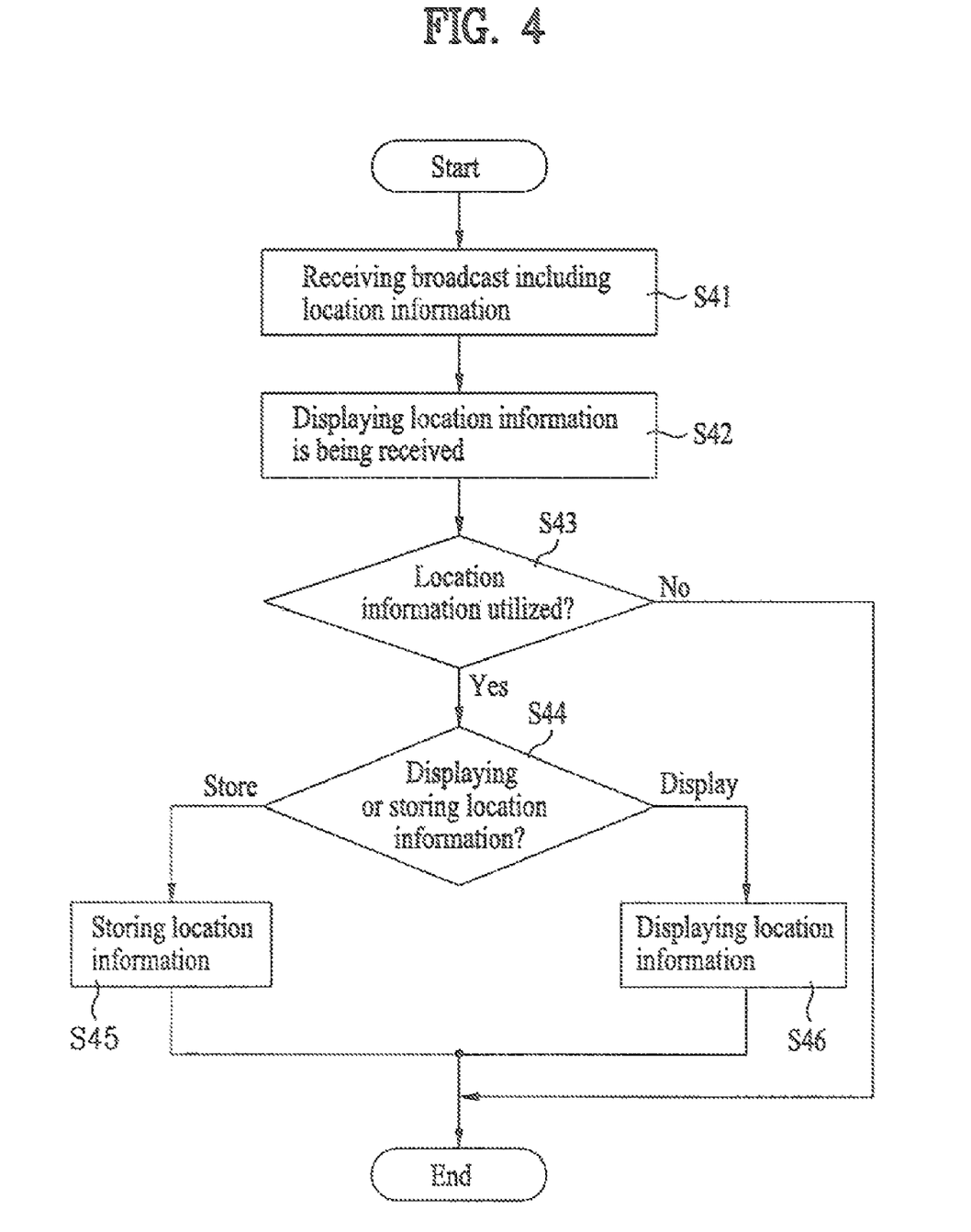
FIG. 4 is a flowchart illustrating a method of receiving a broadcast according to a first embodiment of the present invention.
Figure 5:
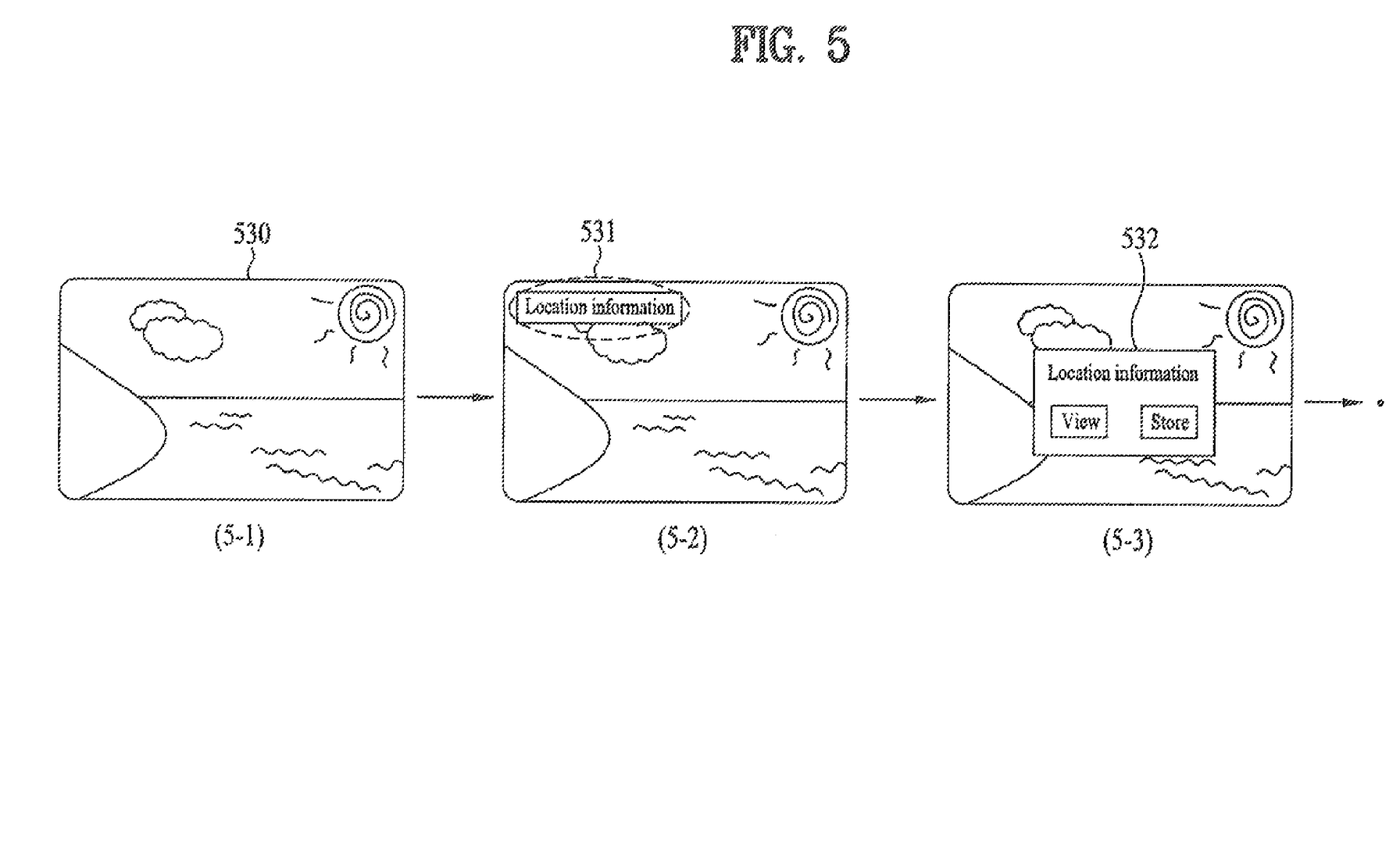

Turning next to FIG. 4, which is a flowchart illustrating a method of receiving a broadcast according to a first embodiment of the present invention. FIG. 1 will also be referred to in this description. As shown in FIG. 4, the mobile terminal 10 receives and displays a broadcast program that includes location information indicating a specific place or location included in the broadcast (S41). FIG. (5-1) of FIG. 5 illustrates the mobile terminal 10 receiving and displaying the broadcast program on the display unit 530. Note that the received broadcast also includes a data broadcast including the location information while displaying the broadcast program.

Then, in step S42, an icon or other identifier is also displayed informing the user that the broadcast includes location information (S42). For example, (5-2) of FIG. 5 illustrates an icon 531 being displayed with the broadcast program, thus informing the user the broadcast program includes location information.

Then, as shown in FIG. 4, the method (or controller 700) determines whether the user wants to utilize the location information (S43). For example, the user can touch the icon

531 to request the location information. If the method determines the user wants to view the location information (Yes in S43), a menu option is displayed asking the user whether he or she wants to view or store the location information (S44). FIG. (5-3) of FIG. 5 illustrates such a menu option 532. Note that the user can also configure the terminal 10 to automatically display the location information or to store the location information without displaying the menu option 532 using various commands on the terminal 10.

Then, in FIG. 4, if the method determines the user wants to store the location information, the location information is stored in the memory unit 300 (S45). Note that the broadcast program can be stored together with the location information. The feature of storing the location information together with the broadcast program will be explained as a separate embodiment later.

Figure 6A:
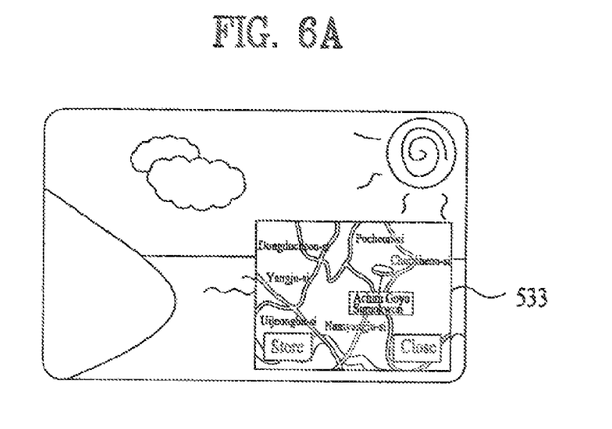

In FIG. 4, if the method determines the user wants to display the location information, the location information is displayed based on a type of the information in the following manner (S46). First, if the location information is latitude/longitude coordinates or a mailing address, the map data stored in the memory unit 300 is used. For example, FIG. 6A illustrates a map 533 indicating a place corresponding to the latitude/longitude or the mailing address corresponding to the location information. Thus, while the user is viewing a broadcast and sees a place or location he is she is interested in, the user can simply select the icon 531 and see a map corresponding to the place or location displayed in the broadcast program.

Figure 6B:
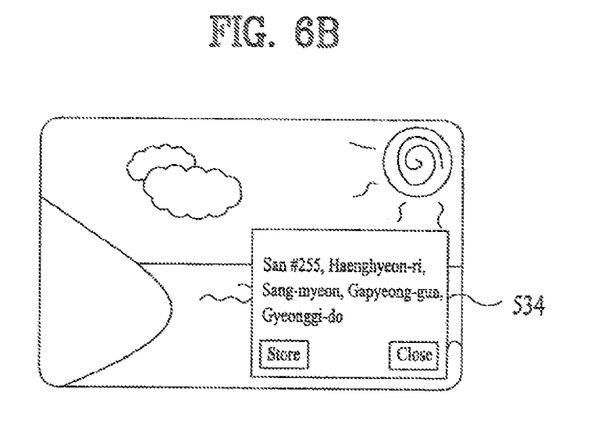
Figure 6C:
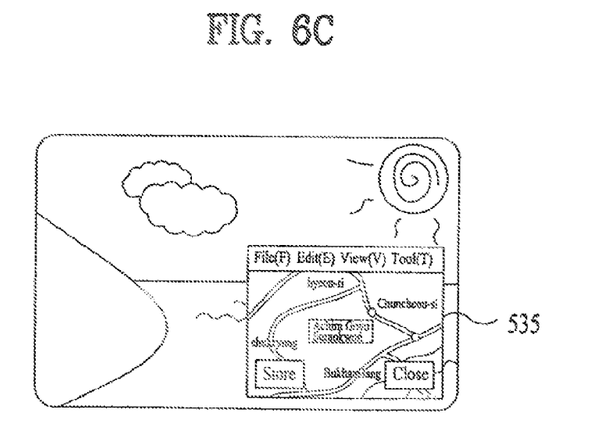

In addition, if the location information is latitude/longitude coordinates corresponding to a mailing address, the coordinates are used to retrieve a mailing address data stored in the memory unit 300. For example, FIG. 6B illustrates a mailing address 534 corresponding to the latitude/longitude being displayed as a text type. Further, if the location information is a mailing address (without latitude/longitude coordinates), the mailing address is displayed as shown in FIG. 6B. The user can also store the mailing address in the memory unit 300 for later use Further, if the location information corresponds to a map image, the map image 533 is displayed as shown in FIG. 6A. Similarly, if the location information corresponds to an Internet address for a specific area or place, a site at the Internet address is accessed via the mobile communication unit 230. Then, information 535 is displayed as shown in FIG. 6C. That is, the information 535 is provided by the site as a web browser type image. In this instance, the Internet site can be a concept included in each entity of a mobile communication network.

Second Embodiment

Figure 7:
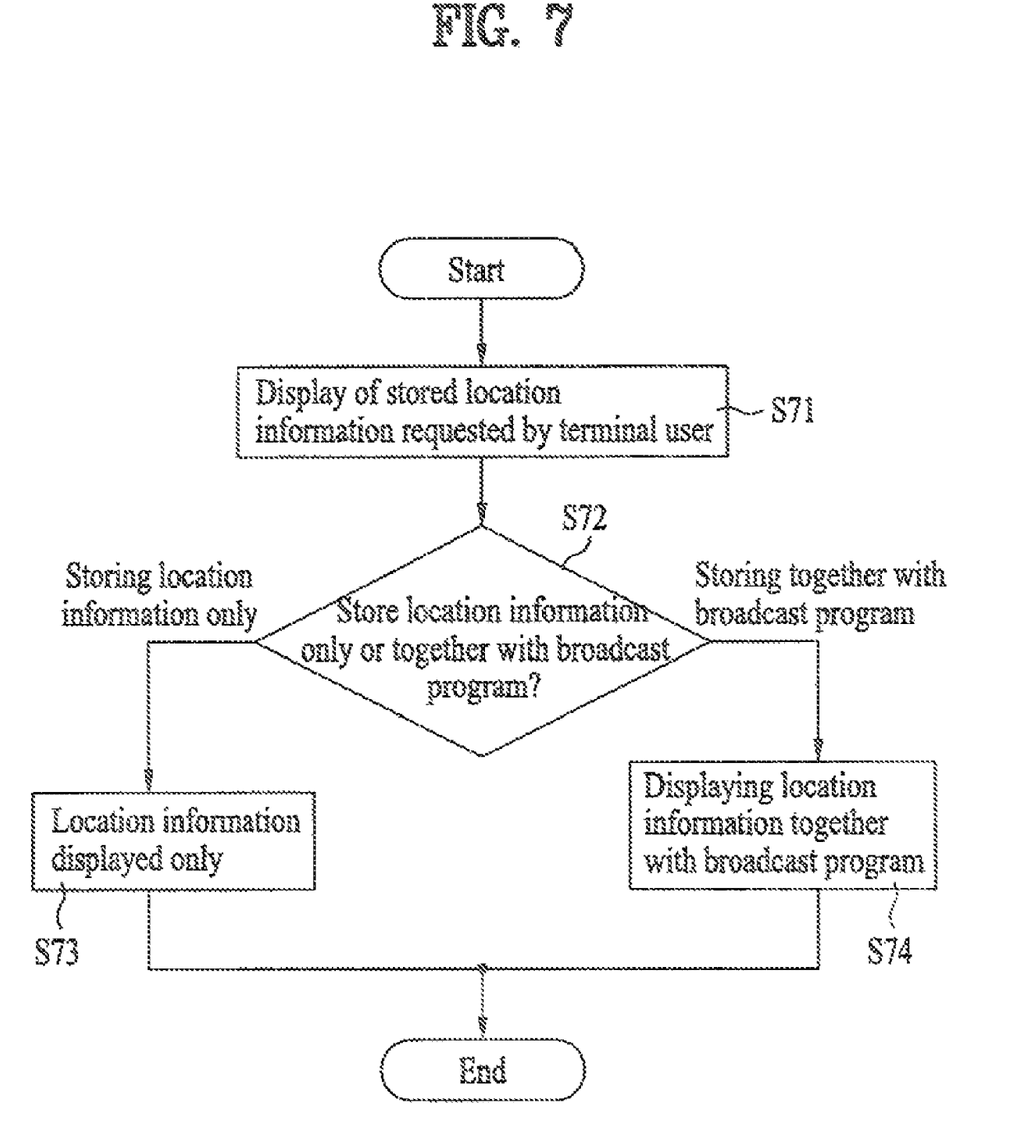
FIG. 7 is a flowchart illustrating a method of displaying stored location information according to a second embodiment of the present invention.

Next, FIG. 7 is a flowchart illustrating a method of displaying stored location information according to the second embodiment of the present invention. FIG. 1 will also be referred to in this description. As shown, the method first receives a request from the user to display location information previously stored in the storing unit 300 (S71). That is, the user can select a stored location information from a list of stored location information, for example. Then, the method determines whether the stored location information is stored together with the corresponding broadcast (S72).

If the location information is stored alone, the location information is displayed alone on the display unit 530 (S73). If the location information is stored together with a broadcast program, the location information and the stored broadcast program are displayed on the display unit 530.

Figure 8:
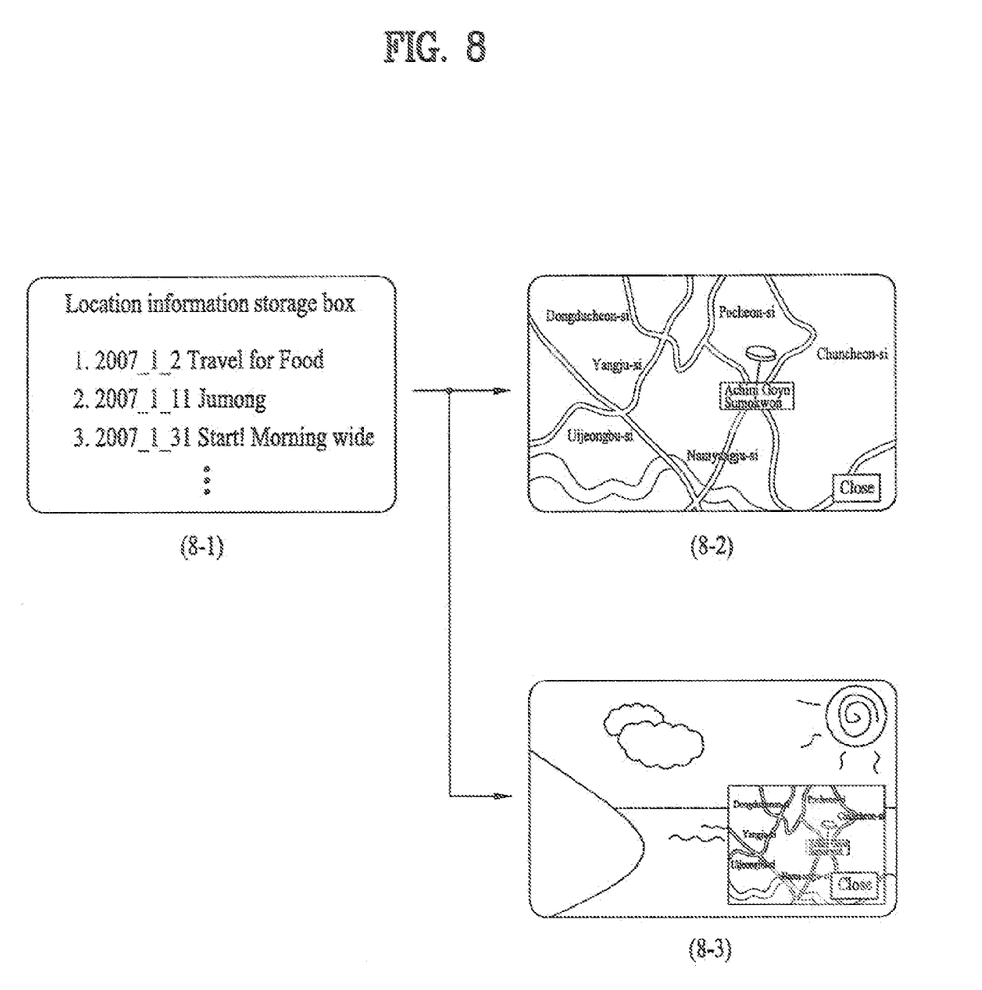
FIG. 8 is an overview illustrating a display unit screen of a mobile terminal implementing a method of receiving a broadcast according to the second embodiment of the present invention.

For example, if the user-selected location information is stored alone, the mobile terminal displays the location information alone (S73) as shown in (8-2) of FIG. 8. If the user-selected location information is stored together with a broadcast program corresponding to the selected location information, the mobile terminal displays the location information together with the broadcast program (S74) as shown in (8-3) of FIG. 8. In addition, when the selected location information is stored together with the broadcast program, it is also possible to display only the location information based on an additional input by the user, for example.

In addition, (8-1) of FIG. 8 illustrates a list of stored location information being displayed to the user. (8-2) of FIG. 8 illustrates the location information (e.g., a map) for the first item in the list (in which the location information corresponds to a map showing a restaurant). (8-3) of FIG. 8 illustrates corresponding to a specific location or place shown in the displayed program "Jumong" when the user selects the second item in the list of stored information.

Third Embodiment

Figure 9:
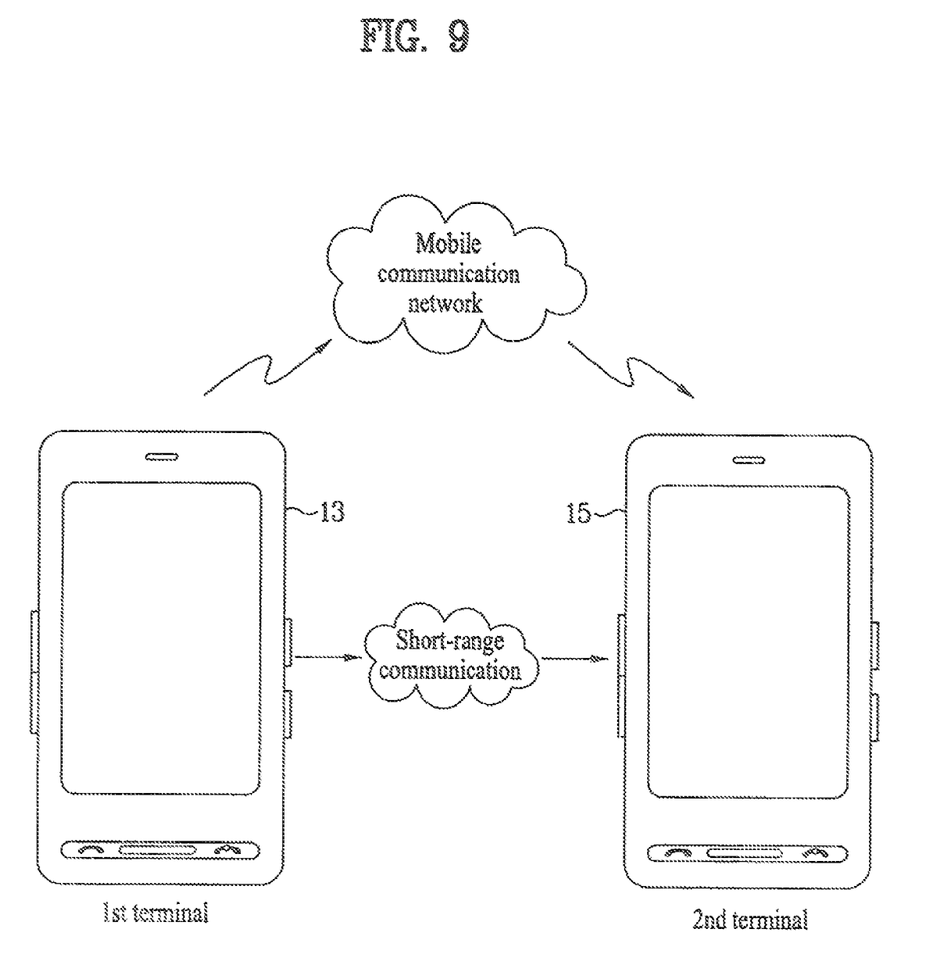
FIG. 9 is an overview illustrating a method of receiving a broadcast according to a third embodiment of the present invention.

Turning now to FIG. 9, which is an overview illustrating a method of receiving and transmitting a broadcast according to a third embodiment of the present invention. As shown, in FIG. 9, the stored location information and/or broadcast program is transmitted to at least one other terminal. In more detail, FIG. 9 illustrates a first terminal 12 receiving and storing location information, and transmitting the location information to a second terminal 15 via a mobile communication using the mobile communication unit 230.

Further, when the location information is text such as latitude/longitude coordinates, a mailing address, an Internet address, etc., the stored location information can be transmitted via an MMS (multimedia messaging system) communication service, an e-mail communication service and SMS (short message service) communication service. In addition, when the location information is a map image, the location information is preferable transmitted as an attached file of the MMS or e-mail communication service.

The first terminal 13 can also transmit the location information to the second terminal 15 via a short-range communication using the short-range communication unit 250 such as the infrared communication system IrDA. Alternatively, a different type short-range communication such as Bluetooth, Zigbee, etc. can be used.

Fourth Embodiment

Figure 10:
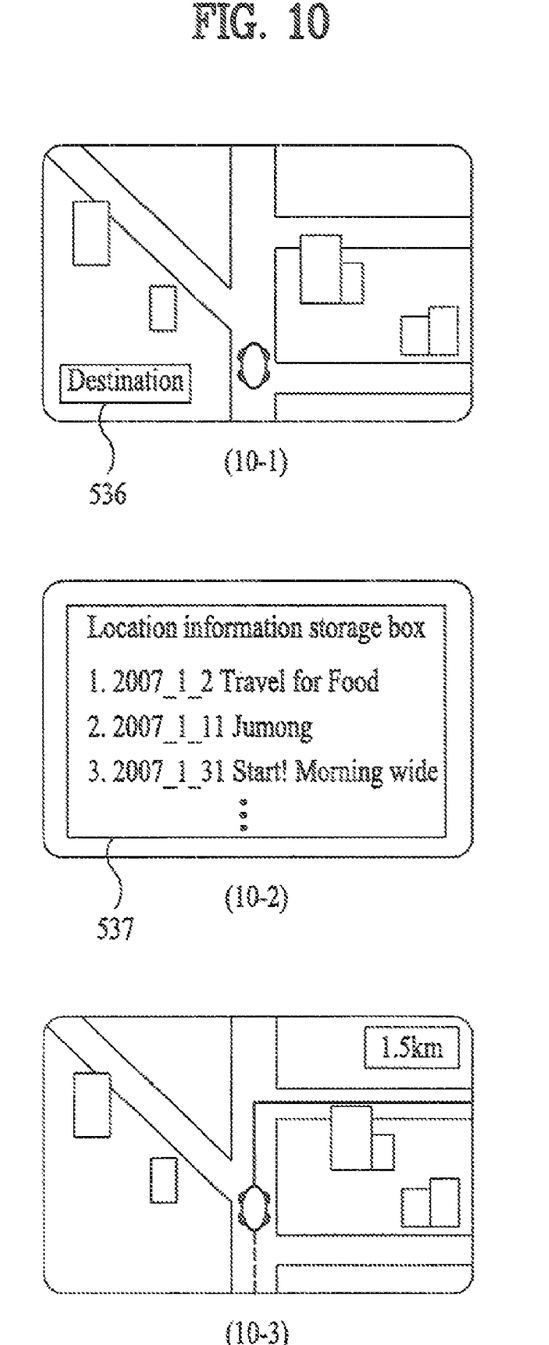
FIG. 10 is an overview illustrating a display unit screen of a mobile terminal implementing a method of receiving a broadcast according to a fourth embodiment of the present invention.

Next, FIG. 10 is an overview illustrating a display unit screen of a mobile terminal implementing a method of receiving a broadcast according to the fourth embodiment of the present invention. FIG. 1 will also be referred to in this description. As shown in (10-1) of FIG. 10, the mobile terminal 10 first enters a navigation function mode shown in (10-1) of FIG. 10.

Subsequently, a user selects an icon 536 for a setting of a destination on the display unit screen. As shown in (10-2), when the user selects the icon 536, the mobile terminal 10 provides a list of previously-stored location information. Then, the user can select any one of the list of stored location information. For example, as shown in (10-3) of FIG. 10, when the user selects item 1 in the list, the mobile terminal 10, sets the selected location information as a destination of the navigation function. Therefore, the user can view directions from where they are currently located to the destination information corresponding the stored location information (i.e., the restaurant corresponding to the item 1 selection).

Fifth Embodiment

The above-description of the first embodiment describes the location information being transmitted via the data broadcast. However, the location information can also be transmitted in various other ways. For example, FIG. 11 is a diagram of a protocol stack of the T-DMB (terrestrial DMB) standard, and FIGS. 12A to 12C are diagrams of MPEG-4 BIFS fields and corresponding display unit screen used to implement a method of receiving a broadcast according to the fifth embodiment of the present invention.

Figure 11:
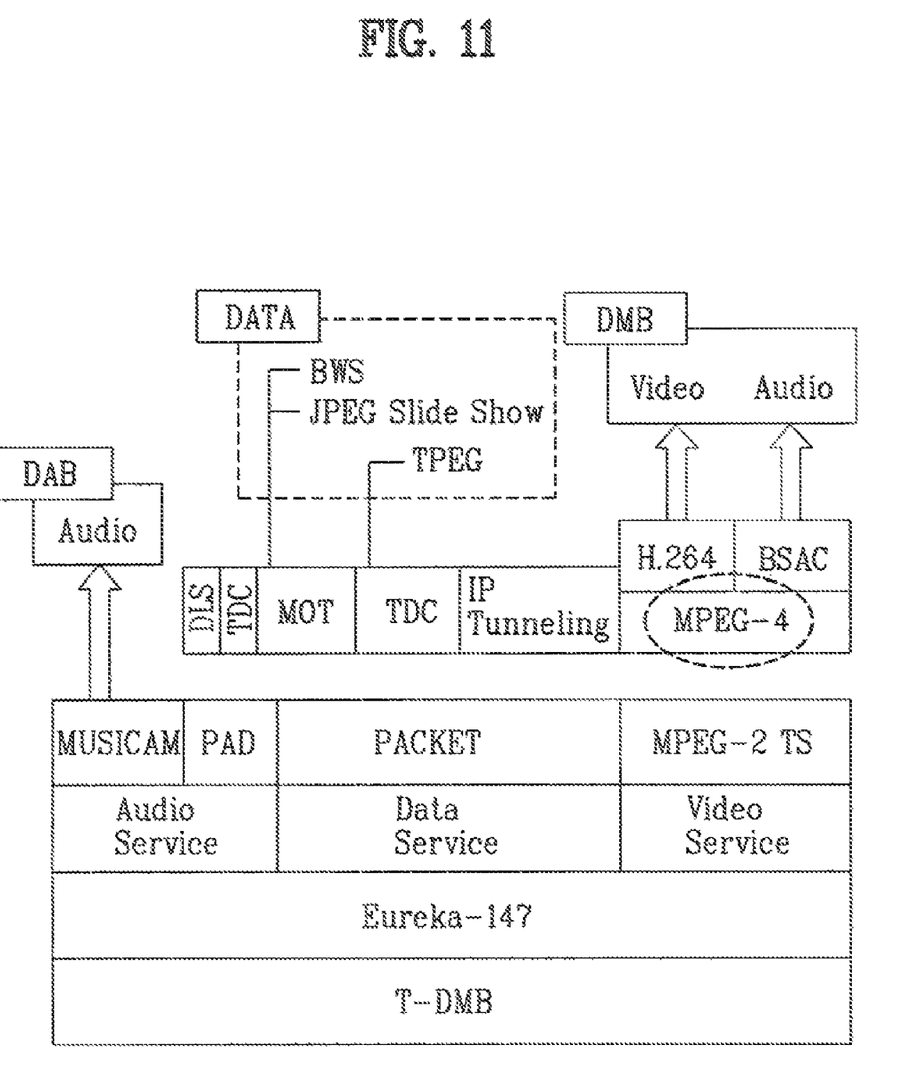
FIG. 11 is a diagram illustrating a protocol stack of the T-DMB (terrestrial DMB) stander.
Figure 12A:
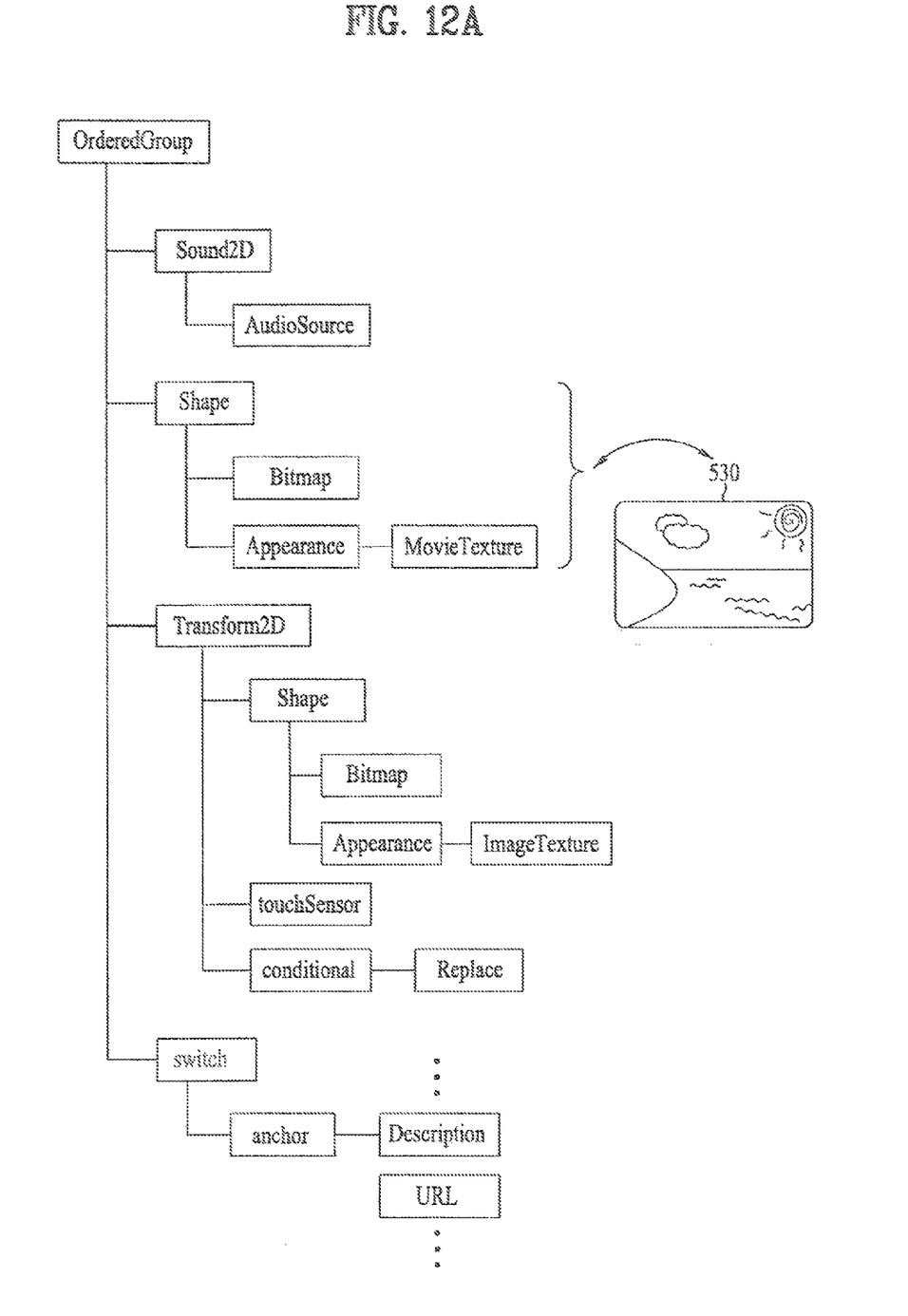
FIGS. 12A to 12C are tree diagrams illustrating an MPEG-4 BIFS field and corresponding display unit screen to implement a method of receiving a broadcast according to a fifth embodiment of the present invention.

That is, in the fifth embodiment, the mobile terminal 10 is assumed to receive a broadcast corresponding to the T-DMB standard using the MPEG-4 BIFS binary format shown in FIG. 11. In more detail, the T-DMB protocol stack shown in FIG. 11 includes MPEG-4 having the MPEG-4 BIFS shown in FIGS. 12A-12C. The MPEG-4 BIFS is an object based multimedia compression scheme, and thus a scene of contents can be configured with several objects resulting from spatiotemporal division and compression.

Thus, in the fifth embodiment, the location information is transmitted via the MPEG-BIFS, which will now be explained with reference to FIGS. 12A to 12C. Referring to FIG. 12A, a received broadcast content includes a plurality of objects in a scene tree format. In addition, in the plurality of the objects, a 'shape' object and other objects below the 'shape' object are used for the video of the broadcast content, and the 'sound2D' object and other objects below the 'sound2D' object are used for the audio of the broadcast content. The video of the broadcast content is then displayed on the display unit screen 530 and the corresponding audio is output via the audio output unit 550.

Figure 12B:
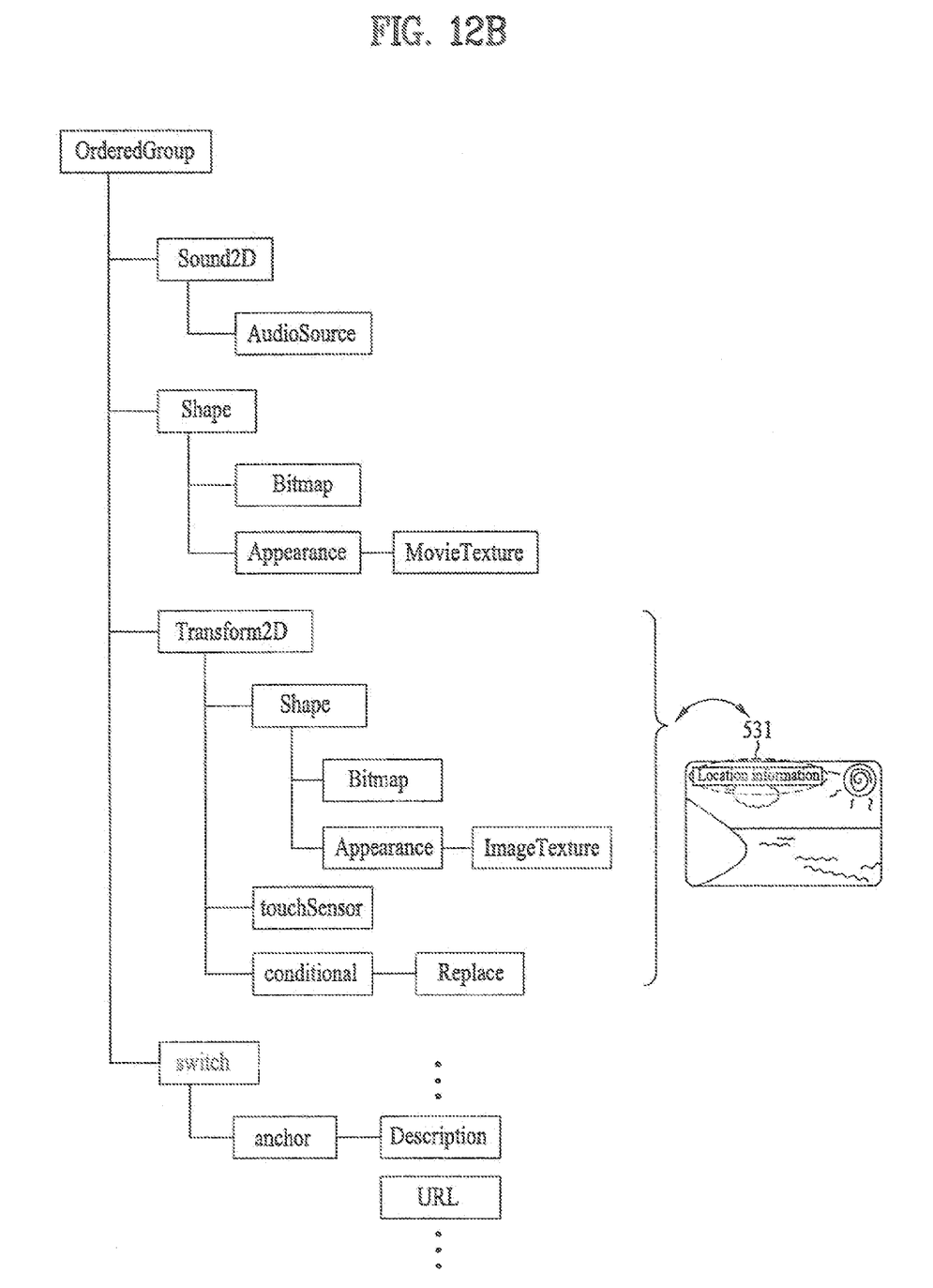
Figure 12C:
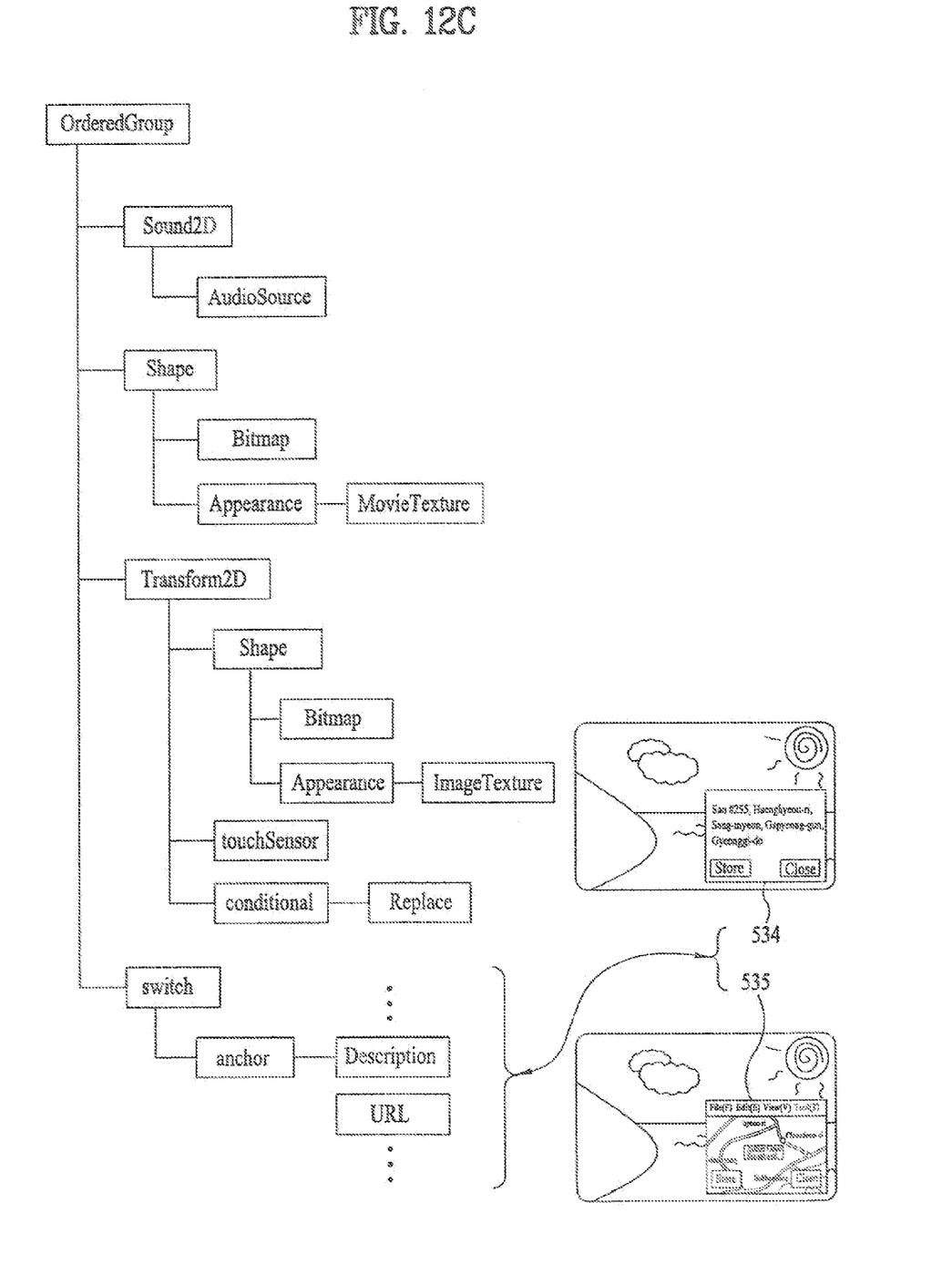

Further, as shown in FIG. 12B, when the location information is received in the mobile terminal 10, the mobile terminal 10 also displays the icon 531 indicating to the user that the location information exists in the broadcast program. In addition, the icon 531 is implemented using the 'Transform2D' object and other objects below the 'Transform 2D' object. In particular, the 'Transform2D' object and other objects below the 'Transform2D', object are used for detecting whether a terminal user touches the icon 531 on the touch screen of the display unit 530.

As shown in FIG. 12C, when the user touches the icon 531, the location information is displayed on the display unit screen. In this example, the location information is implemented using the 'switch' object and other objects below the 'switch', object. In particular, a type of the location information (e.g., latitude/longitude coordinates, mailing address, Internet address, etc.) is recorded in the 'description' object. Further, the location information according to the type can also be recorded in 'URL' object. The method of displaying the location information according to its type has been explained in the description of the first embodiment and thus is not repeated here.

In addition, the fifth embodiment can be extended to other broadcasting specifications implemented an object based multimedia compression scheme as the MPEG-4 BIFS.

Accordingly, the present invention provides the following effects or advantages.

First, the user of the terminal is provided with not only a broadcast program but also information for a specific area of place associated with the broadcast program, i.e., location information. Hence, the user is able to view a particular area or location on the currently displayed broadcast program he or she is interested in learning more about.

Secondly, the location information can be stored alone or together with a corresponding broadcast program. Therefore, the user can playback the broadcast program at a later time and again view particular location information.

Thirdly, a navigation function is also provided allowing a user to view directions on how to get to a specific place or location included in the location information.

Fourthly, the location information can be transmitted to another terminal. Therefore, the user of the first terminal can store the location information in a mobile terminal that does not have a navigation function and transmit the stored location information to another terminal that has a navigation function (such as a navigation terminal included in their car). The user can then used the other terminal to get directions to a specific location or place included in the location information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving broadcast data on a broadcast terminal, the method comprising:

receiving and storing a video broadcast including location information indicating a specific place or location associated with the broadcast program;

receiving a request to display the stored video broadcast;

displaying the stored video broadcast on a display unit of the broadcast terminal according to the request;

displaying a touch icon superimposed on the displayed video broadcast, wherein the location information is requested according to the touch icon superimposed on the displayed video broadcast;

displaying a menu option superimposed on the displayed video broadcast, wherein the location information is viewed or stored, according to the menu option superimposed on the displayed video broadcast;

determining whether the stored location information is stored with the corresponding video broadcast;

if the stored location information is determined to be stored with the corresponding broadcast, displaying the stored location information superimposed on the displayed video broadcast and displaying a plurality of touch icons superimposed on the displayed location information; and transmitting the stored location information via a multimedia messaging system (MMS) communication service, an e-mail communication service, or a short message service (SMS) communication service, wherein the stored location information includes a map image, a mailing address, or an Internet address.

2. The method of claim 1, wherein the displaying step includes extracting the location information from a signal corresponding to the broadcast.

3. The method of claim 1, wherein the broadcast includes video and audio data, and wherein the location information is received via a separate data broadcast.

4. The method of claim 1, wherein the location information comprises at least one of a latitude/longitude coordinate of the specific place or location, a mailing address of the specific place or location, a map image of the specific place or location and an Internet address associated with the specific place or location.

5. The method of claim 1, further comprising:
displaying a location information mark on the display unit of the broadcast terminal indicating that the corresponding broadcast includes the location information.

6. The method of claim 5, further comprising:
outputting the location information in response to a user selection of the displayed location information mark.

7. The method of claim 1, further comprising:
transmitting the stored location information to another broadcast terminal.

8. The method of claim 7, wherein the transmitting step transmits the location information using a mobile communication network or using a short-range communication network.

9. The method of claim 1, further comprising:
registering the stored location information as a destination location; and
providing directions from a current location of the broadcast terminal to the destination location.

10. The method of claim 1, further comprising:
registering the stored location information as a destination information;
transmitting the destination information to another terminal including a navigation function; and
providing directions on the other terminal from a current location of the other terminal to the destination location.

11. A broadcast terminal comprising:
a broadcast terminal configured to receive broadcast data;
a memory configured to store a video broadcast including location information indicating a specific place or location associated with the broadcast program;
a display unit configured to display:
the stored video broadcast on a display unit of the broadcast terminal according to the request,
a touch icon superimposed on the displayed video broadcast, wherein the location information is requested according to the touch icon superimposed on the displayed video broadcast,
a menu option superimposed on the displayed video broadcast, wherein the location information is viewed or stored, according to the menu option superimposed on the displayed video broadcast, and
the stored location info illation or a specific location corresponding to the location information, superimposed on the displayed video broadcast, and a plurality of touch icons superimposed on the displayed location information, if the stored location information is determined to be stored with the corresponding broadcast; and a control unit operatively connected to the memory, the display unit and the broadcast unit, the control unit configured to:
receive a user request to display previously stored location information, and
determine whether or not the stored location information is stored with a corresponding broadcast,
wherein the broadcast terminal is further configured to transmit the stored location information via a multimedia messaging system (MMS) communication service, an e-mail communication service, or a short message service (SMS) communication service, and
wherein the stored location information includes a map image, a mailing address, or an Internet address.

12. The broadcast terminal of claim 11, wherein the control unit extracts the location information from a signal corresponding to the broadcast.

13. The broadcast terminal of claim 11, wherein the broadcast includes video and audio data, and wherein the location information is received via a separate data broadcast.

14. The broadcast terminal of claim 11, wherein the location information comprises at least one of a latitude/longitude coordinate of the specific place or location, a mailing address of the specific place or location, a map image of the specific place or location and an Internet address associated with the specific place or location.

15. The broadcast terminal of claim 11, wherein the control unit controls the display unit to display a location information mark indicating that the corresponding broadcast includes the location information.

16. The broadcast terminal of claim 15, wherein the control unit outputs the location information in response to a user selection of the displayed location information mark.

17. The broadcast terminal of claim 11, further comprising:
a transmitting unit configured to transmit the stored location information to another terminal.

18. The broadcast terminal of claim 17, wherein the transmitting unit transmits the location information using a mobile communication network or using a short-range communication network.

19. The broadcast terminal of claim 11, wherein the control unit registers the stored location information as a destination location, and provides directions from a current location of the broadcast terminal to the destination location.

20. The broadcast terminal of claim 11,
wherein the control unit registers the stored location information as a destination information, and
wherein the transmitting unit transmits the destination information to another terminal including a navigation function such that a control unit included in the another terminal can provide directions on the another terminal from a current location of the another terminal to the destination location.

* * * * *